United States Patent
Bowen et al.

(10) Patent No.: US 9,487,304 B1
(45) Date of Patent: Nov. 8, 2016

(54) ADVISORY GENERATING SYSTEM, DEVICE, AND METHOD

(71) Applicant: ROCKWELL COLLINS, INC., Cedar Rapids, IA (US)

(72) Inventors: Eric A. Bowen, Marion, IA (US); John W. Romine, III, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 563 days.

(21) Appl. No.: 14/022,349

(22) Filed: Sep. 10, 2013

(51) Int. Cl.
*G01S 13/93* (2006.01)
*B64D 45/00* (2006.01)

(52) U.S. Cl.
CPC ..................... *B64D 45/00* (2013.01)

(58) Field of Classification Search
CPC ........ G08G 5/025; G08G 5/065; G08G 5/06; G08G 5/0021; G08G 5/0026; G08G 5/0043; G08G 5/0047; G01C 23/005; G01C 23/00; G01S 13/93; G01S 19/15; G01S 19/51; G01S 2013/916
See application file for complete search history.

(56) References Cited

U.S. PATENT DOCUMENTS

| | | | | |
|---|---|---|---|---|
| 7,342,514 B1 * | 3/2008 | Bailey | ................... | G01C 23/005 340/961 |
| 7,965,223 B1 * | 6/2011 | McCusker | ............ | G01S 13/913 340/961 |
| 7,974,773 B1 | 7/2011 | Krenz et al. | | |
| 8,193,948 B1 * | 6/2012 | Shapiro | ................... | G08G 5/065 340/945 |
| 8,401,775 B2 * | 3/2013 | Rozovski | ............. | G08G 5/0013 340/972 |
| 8,566,016 B2 * | 10/2013 | Law | ........................ | G08G 5/065 701/1 |
| 8,965,671 B2 * | 2/2015 | Choksi | ................... | G08G 5/065 701/120 |
| 9,135,827 B1 * | 9/2015 | Carrico | ................ | G08G 5/0026 |
| 2004/0030465 A1 * | 2/2004 | Conner | ................... | G01S 19/15 701/16 |
| 2005/0128129 A1 * | 6/2005 | Conner | ................... | G01S 19/15 342/36 |
| 2006/0259232 A1 * | 11/2006 | Huthoefer | .............. | G08G 5/065 701/120 |
| 2010/0114922 A1 * | 5/2010 | Gayraud | ................ | G08G 5/065 707/758 |

(Continued)

OTHER PUBLICATIONS

"Embedded Interchange Format for Airport Mapping Database"; Jun. 25, 2012; ARINC Specification 816-2; Aeronautical Radio, Inc.; Annapolis, Maryland.

(Continued)

*Primary Examiner* — Thomas Tarcza
*Assistant Examiner* — Edward J Pipala
(74) *Attorney, Agent, or Firm* — Daniel M. Barbieri; Donna P. Suchy; Angel N. Gerdzhikov (57) ABSTRACT

A system, device, and method for generating at least one advisory presentable on one or more presentation units are disclosed, where the advisory may draw an operator's attention to future turns of the vehicle such as, but not limited to, an aircraft. An advisory generator ("AG") may be configured to receive navigation data; receive feature data representative of one or more edges associated with the designated surface and location/coordinate information associated with one or more nodes of each edge; generate an advisory data set representative of one or more first distances in response to the determination; and provide the advisory data set to the presentation system. The designated surface could include a landing runway, a takeoff runway, and/or a current surface upon which the vehicle operates. One first distance may be a shortest distance (i.e., a distance to the closest intersection).

20 Claims, 6 Drawing Sheets

(56) References Cited

U.S. PATENT DOCUMENTS

| | | | | |
|---|---|---|---|---|
| 2011/0130963 A1* | 6/2011 | Feyereisen | ............. | G01C 23/00 701/455 |
| 2012/0035849 A1* | 2/2012 | Clark | ................ | G01C 23/00 701/467 |
| 2012/0253649 A1* | 10/2012 | McGuffin | ............... | G08G 5/065 701/120 |
| 2014/0088857 A1* | 3/2014 | Hollin, Jr. | .............. | G10D 3/163 701/120 |
| 2014/0129125 A1* | 5/2014 | Ovens | ................ | G08G 5/0021 701/300 |
| 2014/0297168 A1* | 10/2014 | Ovens | ................ | G01C 21/3626 701/120 |

OTHER PUBLICATIONS

"User Requirements for Aerodrome Mapping Information"; Sep. 28, 2011; RTCA DO-272C; RTCA, Inc.; Washington, D.C.

* cited by examiner

ADVISORY GENERATING SYSTEM, DEVICE, AND METHOD

BACKGROUND OF THE INVENTION

Field of the Invention

This invention pertains generally to the field of vehicular display systems such as, but not limited to, aircraft display systems Description of the Related Art Aeronautical Radio, Inc. ("ARINC") and/or Radio Technical Commission for Aeronautics ("RTCA") develop aviation industry standards. Two of the standards are ARINC Specification 816 entitled "Embedded Interchange Format for Airport Mapping Database" ("ARINC 816") and RTCA DO-272C entitled "User Requirements for Aerodrome Mapping Information" ("DO-272"). As the titles suggest, these standards address issues regarding the mapping of airports and the protocols for storing data corresponding to mapping. These standards have been developed, in part, due to airport complexity combined with the growth of traffic on the ground increases the level of risk during taxi operations. As a result, embedded systems for aircraft taxi operations are being developed in order to ease the pilots' tasks and to improve crew familiarity with the airport and situational awareness. At the time of this writing, Airport Mapping Databases (singularly, "AMDB") are being produced and used by such embedded systems.

In June 2012, Supplement 2 of ARINC 816 was published as ARINC 816-2. Supplement 2 introduced the concept of an Aerodrome Surface Routing Network ("ASRN") comprised of a web of nodes and edges connecting the nodes. Basically, data representative of nodes and edges stored in the AMDB have been added to data that was being stored prior to the introduction of Supplement 2, where such previously-stored data includes data representative of runway features, helipad features, taxiway features, frequency area features, apron features, parking features, vertical structure features, water, and construction areas. When this data is applied, the images of airport surfaces, surface markings, and airport structures (to name a few) may be easily rendered by an image generator. The addition of the ASRN will improve upon the information presented as the ASMM is rendered as an image.

BRIEF SUMMARY OF THE INVENTION

A present novel and non-trivial system, device, and method for generating at least one advisory presentable on one or more presentation units are disclosed. With the embodiments disclosed herein, data developed for the ASRN may be employed to generate one or more advisories unrelated to the rendering of an image of an ASMM.

In one embodiment, a system is disclosed for presenting one or more advisories via one or more presentation units. The system may be comprised a source of navigation data, a source of feature data, an advisory generator ("AG"), and a presentation system. The source of navigation data could be configured to provide data representative of at least vehicle location and a designated surface, and the source of feature data could be configured to provide node and edge data representative of node, edge, and node location/coordinate information. The presentation system could be comprised of a visual display unit(s), an aural alerting unit(s), and/or a tactile alerting unit(s).

In another embodiment, a device is disclosed for presenting one or more advisories via one or more presentation units. The device may be comprised of the AG configured to perform the method disclosed in the following paragraph.

In another embodiment, a method is disclosed for presenting one or more advisories via one or more presentation units. The method may be comprised of receiving navigation data; retrieving feature data representative of at least one or more edges associated with the designated surface and coordinate information associated with one or more nodes of each edge; determining one or more first distances based upon the vehicle location and the coordinate information associated with at least one node of each edge located in the direction of vehicle travel; generating an advisory data set representative of one or more first distances in response to the determination; and providing the advisory data set to the presentation system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
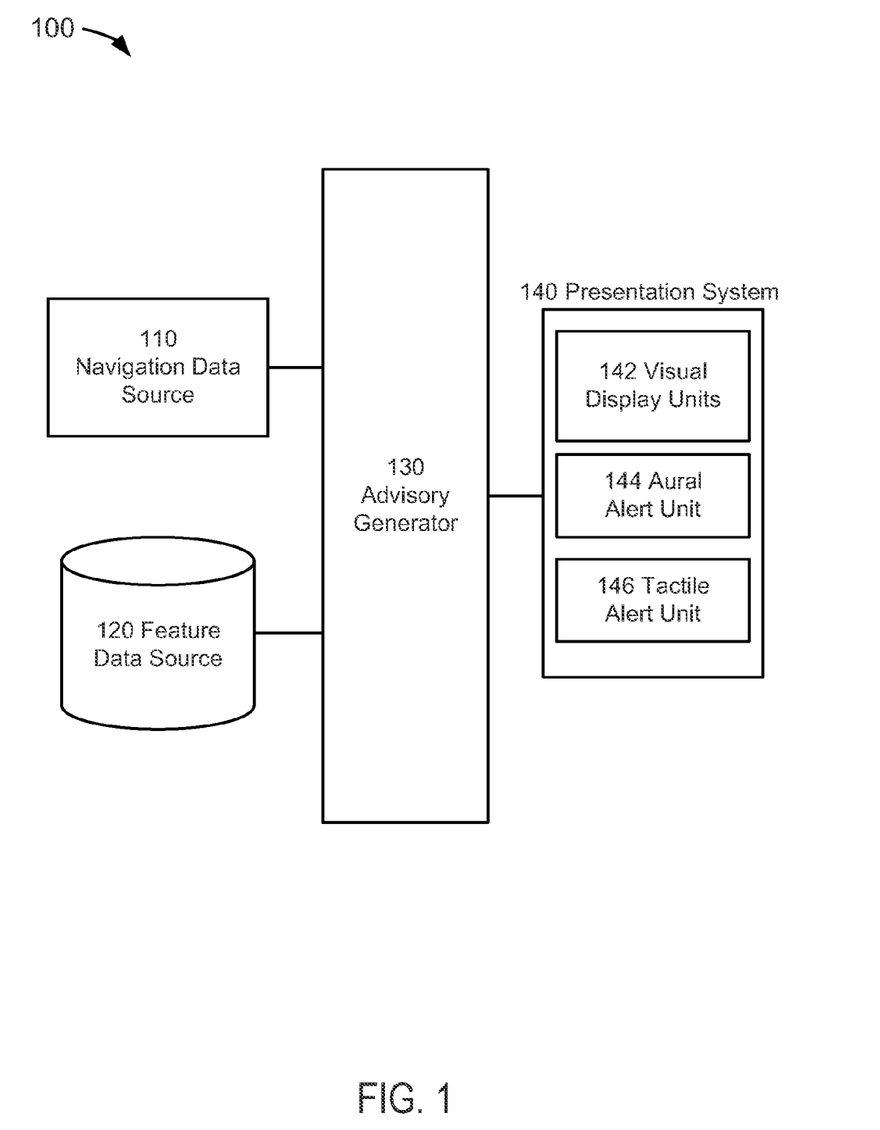
FIG. 1 depicts a block diagram of an advisory generating system.

FIG. 1 depicts a block diagram of an advisory generating system 100 suitable for implementation of the techniques described herein. The generating system 100 of an embodiment of FIG. 1 includes a navigation data source 110, a feature data source 120, an advisory generator ("AG") 130, and a presentation system 140.

In an embodiment of FIG. 1, the navigation data source 110 could be comprised of a system or systems that provide navigation data information in an aircraft. As embodied herein, the navigation data could include clearance data representative of flight clearance information (including flight plan and/or landing runway information) and/or clearance data representative of taxi information such as a route and/or takeoff runway specified in a taxi clearance. For the purposes of the disclosures discussed herein, an aircraft could mean any vehicle which is able to fly through the air or atmosphere including, but not limited to, lighter than air vehicles and heavier than air vehicles, wherein the latter may include fixed-wing and rotary-wing vehicles. Although the discussion herein will be drawn towards a vehicle comprised of an aircraft and a vehicle operator comprised of a pilot, the embodiments herein may be applied in any vehicle operated by a human and/or machine and operated over the land (e.g., automobiles, trucks, motorcycles, etc. . . . ) and/or on or below water.

The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, and/or attitude. As embodied herein, aircraft position includes geographic position (e.g., latitude and longitude coordinates), altitude, or both, and direction may be derived from either geographic position, aircraft position, or both. As embodied herein, aircraft orientation may include pitch, roll, and/or yaw information related to the attitude of the aircraft. The navigation data source 110 could provide the navigation data to the AG 130 for subsequent processing as discussed herein.

As embodied herein, the navigation data source 110 could also include a flight management system ("FMS") which could perform a variety of functions performed to help the crew in the management of the flight; these functions are known to those skilled in the art. These functions could include maintaining the current location of the aircraft either on the ground (i.e., the name of the taxiway) or in the air and/or receiving and storing taxi route information comprised of one defined surface or a series of defined surfaces. The FMS may also allow for the modification of the taxi data.

In an embodiment of FIG. 1, the feature data source 120 could be comprised one or more sources of feature data corresponding to manmade surface features. The feature data source 120 could be any database comprised of one or more airport mapping databases configured to store, in part, data representative of any network that may be comprised of nodes, node geometry coordinates, and edges (i.e., lines or curves) connected to the nodes; for the purpose of illustration and not of limitation, one such network is an Aerodrome Surface Routing Network ("ASRN") described in recent revisions of industry standards published by Aeronautical Radio, Inc. ("ARINC") and/or Radio Technical Commission for Aeronautics ("RTCA") such as, but not limited to, ARINC Specification 816-2 entitled "Embedded Interchange Format for Airport Mapping Database" ("ARINC 816") and RTCA DO-272C entitled "User Requirements for Aerodrome Mapping Information" ("DO-272"); both ARINC 816 and DO-272 are hereby incorporated by reference in their entirety. The feature data source 120 is a data source known to those skilled in the art.

In an embodiment of FIG. 1, the AG 130 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The AG 130 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), Application Specific Integrated Circuits (ASIC), and signal generators; however, for the embodiments disclosed herein, the term "processor" is not limited to such processing units and its meaning is not intended to be construed narrowly. For instance, a processor could also be comprised of more than one electronic data processing unit. As embodied herein, the AG 130 could be a processor(s) used by or in conjunction with any other system of the aircraft including, but not limited to, a processor(s) associated with a vision system such as a synthetic vision system ("SVS"), an enhanced vision system ("EVS"), a combined SVS-EVS, an FMS, a TAWS, an AAWS, an indicating system or a display unit(s) thereof, or any combination thereof.

The AG 130 may receive input data from various system(s), panel(s), module(s) and/or component(s) including, but not limited to, the navigation data source 110 and the feature data source 120. The AG 130 may be electronically coupled to systems and/or sources to facilitate the receipt of input data; as embodied herein, operatively coupled may be considered as interchangeable with electronically coupled. The AG 130 may provide output data to various systems and/or units including, but not limited to, the presentation system 140. The AG 130 may be electronically coupled to systems and/or units to facilitate the providing of output data. It is not necessary that a direct connection be made; instead, such receipt of input data and the providing of output data could be provided through a data bus or through a wireless network.

In an embodiment of FIG. 1, the presentation system 140 could be comprised of any unit of which visual, aural, and/or tactile indications may be presented to the pilot including, but not limited to, a visual display unit(s) 142, an aural alerting unit 144, and/or a tactile alerting unit 146. The visual display unit 142 could be comprised of any unit having a display surface on which information may be presented to the pilot. The visual display unit 142 could be part of an Electronic Flight Information System ("EFIS") and could be comprised of, but is not limited to, a Primary Flight Display ("PFD"), Navigation Display ("ND"), Head-Up Display ("HUD"), Head-Down Display ("HDD"), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphone, and tablets), and/or Data Link Control Display Unit. As embodied herein, the visual display unit 142 may include a vision system (not shown) which generates an image data set which represents the image displayed on a display unit. Vision systems include, but are not limited to, the SVS, the EVS, a combined SVS-EVS, or combination thereof.

The visual display unit 142 could be considered as tactical display unit(s) and/or a strategic display unit(s). The tactical display unit could be any unit which presents tactical information to the crew relative to the instant or immediate control of the aircraft, whether the aircraft is in flight or on the ground. The tactical display unit could be an HDD unit and/or a HUD unit. The HDD unit is typically a unit mounted to an aircraft's flight instrument panel located in front of a pilot and below the windshield. The HUD unit is mounted in front of the pilot at windshield level. The HUD unit is advantageous because the display is transparent allowing the pilot to keep his or her eyes "outside the cockpit" while the display unit provides tactical flight information to the pilot. Examples of a HDD and a HUD are presented by Krenz et al in U.S. Pat. No. 7,974,773 entitled "Methods and Devices of an Aircraft Taxi Navigation System" (collectively, "the Krenz reference"), which is incorporated by reference herein in its entirety.

The tactical display unit could display the same information found on a PFD, such as "basic T" information (i.e., airspeed, attitude, altitude, and heading). Although it may provide the same information as that of a PFD, a tactical display unit may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display unit is designed to provide flexible configurations which may be tailored to the desired configuration specified by a buyer or user of the aircraft.

The strategic display could be any unit which presents strategic information to the crew relative to the intended future state(s) of the aircraft (e.g., intended location in space at specified times) along with information providing contextual information to the crew (e.g., terrain, navigation aids, geopolitical boundaries, airspace boundaries, etc.) about such state(s). One example of such display unit is an ND. As embodied herein, the strategic display unit could be configured to display a surface map such as, for example, an airport surface map (or airport surface moving map ("ASMM")).

Returning to FIG. 1, the visual display unit could be capable of presenting advisory information which may be information that is projected or displayed on a cockpit display unit to present a condition, situation, or event to the pilot including other display units in addition to the tactical display unit and the strategic display unit. Advisory information may include alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. As embodied herein, both caution and warning alerts may be presented in combination with or simultaneous to aural alerts and/or tactile alerts. Non-alerts may be any other information not requiring immediate crew attention or awareness. Alerts may be presented visually by depicting one or more colors and may be presented on a display unit indicating one or more levels of threat. For the purpose of illustration and not limitation, amber or yellow may indicate a caution alert, red may indicate a warning alert, and green or cyan may indicate a non-alert.

In one embodiment, visual alerts could be presented in a textual form including colored text messages such as an amber or yellow when the conditions for a caution alert have been met or a red when the conditions for a warning alert have been met. In another embodiment, visual alerts could be presented in non-textual forms including, but not limited to, a graphical object highlighting a distance and/or intersection discussed in detail below. In another embodiment, non-textual and textual forms could be displayed in color to indicate the level of threat, e.g., amber or yellow may indicate a caution alert and red may indicate a warning alert. In another embodiment, non-textual and textual forms could remain steady or flash intermittently; the occurrence of such flashing could depend on the distance and/or time between a point of a surface corresponding to a node and ownship, and the rate of flashing could represent a specific range to the surface point. Examples using visual alerts are discussed in detail below.

Returning to FIG. 1, the aural alerting unit 144 may be any unit capable of producing aural alerts. Aural alerts may be discrete sounds, tones, and/or verbal statements used to annunciate a condition, situation, or event. For example, in an embodiment associated with landing operations, an aural alert could call out "CAUTION—RUNWAY THRESHOLD APPROACHING" or "CAUTION—LAHSO APPROACHING" (where LAHSO could mean "Land and Hold Short Operation") when the conditions for a caution alert have been met or "WARNING—RUNWAY THRESHOLD APPROACHING" or "WARNING—LAHSO APPROACHING" when the conditions for a warning alert have been met, and either or both could be accompanied with tonal indicators. As embodied herein, both caution and warning aural alerts could be presented in combination with or simultaneous to visual alerts and/or tactile alerts.

In an embodiment of FIG. 1, the tactile alerting unit 146 may be any unit capable of producing tactile alerts. Tactile alerts may be any tactile stimulus to present a condition, situation, or event to the pilot such as, but not limited to, a warning alert and/or a caution alert. Moreover, tactile alerts could be presented in combination with or simultaneous to visual alerts and/or tactile alerts. As embodied herein, one or more units of the presentation system 140 may receive an advisory data set provided by the AG 130.

Figure 2:
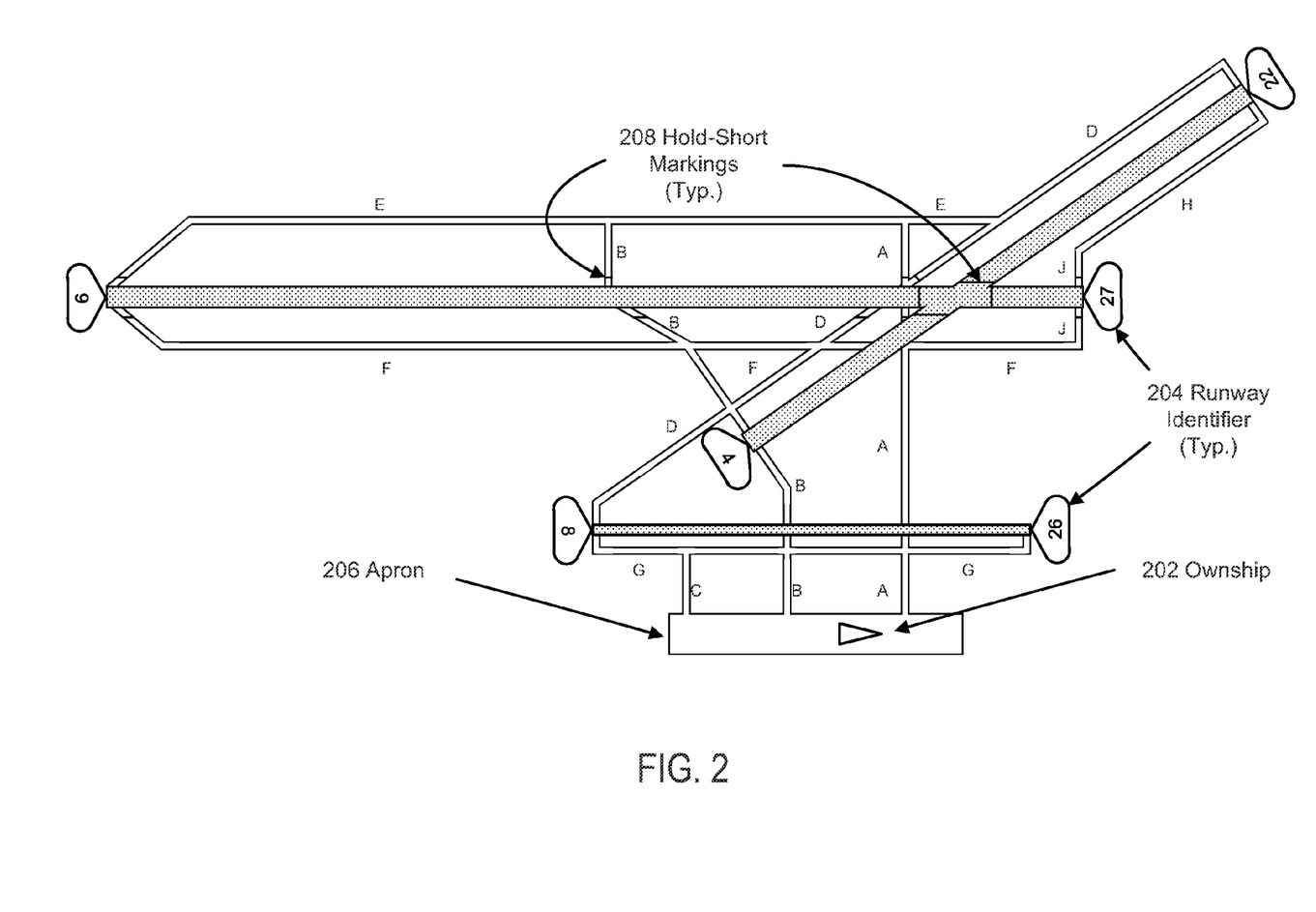
FIG. 2 provides an illustration of an image of an airport surface moving map ("ASMM") presentable on a visual display unit 142.

In an embodiment of FIG. 2, an illustration of an image of an ASMM presentable on the visual display unit 142 is provided as an exemplary illustration of ownship and airport surfaces. FIG. 2 depicts the position of ownship 202 in relation to taxiways and runways, where the runways have been identified by a directional runway identifier 204 as the following: RWY 4/22, RWY 9/27, and RWY 8/26. The directional runway identifiers 204 could be employed to identify each runway. As embodied herein, data representative of such directional runway identifiers 204 could be provided by the feature data source 120. Directional runway identifiers were disclosed by Barber et al in U.S. Pat. No. 8,396,661 entitled "System, Module, and Method for Presenting Surface Symbology on an Aircraft Display Unit," which is incorporated by reference herein in its entirety.

For the purpose of illustration only, illustrations of hold-short markings 208 are limited to both the intersection of RWY 4/22 with RWY 9/27 and the intersections of taxiways with RWY 9/27; hold-short markings applicable to the intersections of taxiways with RWY 9/27 and RWY 8/26 have been intentionally omitted. For the purpose of illustration and not limitation, ownship 202 symbology is depicted as a triangle in FIG. 2; those skilled in the art know that the symbology for depicting ownship 202 may be configurable by a manufacturer and/or end-user. From the information depicted in FIG. 2, ownship 202 is located on apron 206 (or tarmac).

The advantages and benefits of the embodiments discussed herein may be illustrated in FIGS. 3A through 4C by showing an example of an ASRN comprised of nodes and edges for RWY 9/27 and the intersecting taxiways. It should be noted that only six node types and three edge types are presented herein for the purposes of briefly illustrating one possible configuration of an ASRN illustration and briefly introducing some of the teachings of ARINC 816 and DO-272 that may be relevant to the disclosures presented herein.

ARINC 816 defines attributes of an ASRN node objects which include the following attributes: identifier number, feature identifier, feature type, feature name, and node type. The node identifier number may be a unique identifier assigned to one node by a data provider. The feature identifier may be a logical name of the node. The feature type may be an identifier which identifies the type of feature as a node (ARINC 816 has assigned "40" for the node). The feature name may be the name of the feature. The node type may be a type of node.

Figure 3A:
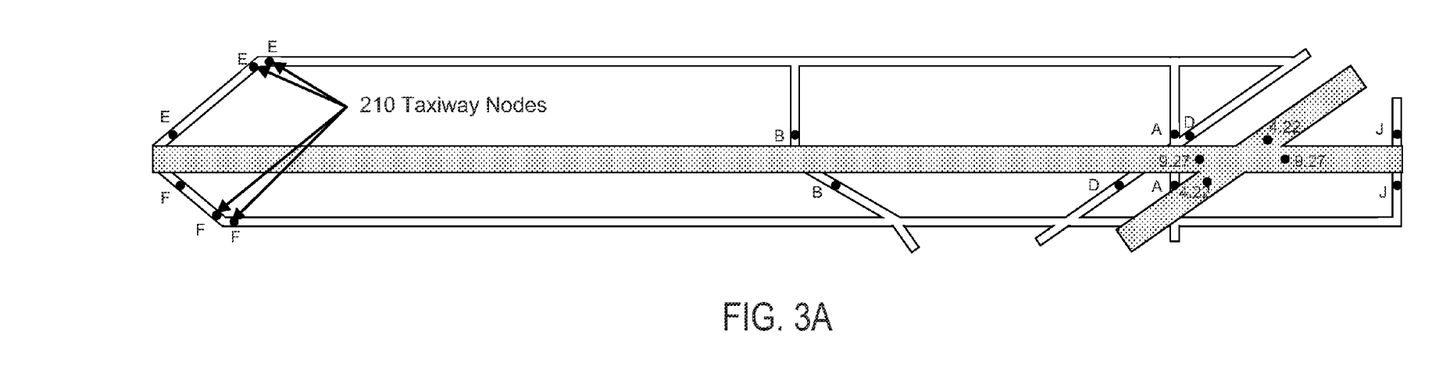
FIG. 3A illustrates "taxiway" node types, "taxiway holding position" node types, and "runway holding position" node types.

Referring to FIG. 3A, three nodes types are presented. The first type may be a "taxiway" node type, where four of them are illustrated by the plurality of Taxiway Nodes 210. As shown, two feature identifiers are "E", and two are "F" corresponding to the name of the correlating taxiway. It should be noted that, although many taxiway node types exist elsewhere for the surfaces shown in FIG. 3A, they have been intentionally omitted; only these four taxiway node types have been provided for the purpose of illustration and introduction.

The second type shown in FIG. 3A may be a "taxiway holding position" node type, where ten of them are illustrated. As shown, one feature identifier is "E", one is "F", two are "B", two are "A", two are "D", and two are "J". The third type may be "runway holding position" node type, where four of them are illustrated. As shown, two feature identifiers are "4.22" and two are "9.27" correspond to the name of the correlating runways.

Figure 3B:
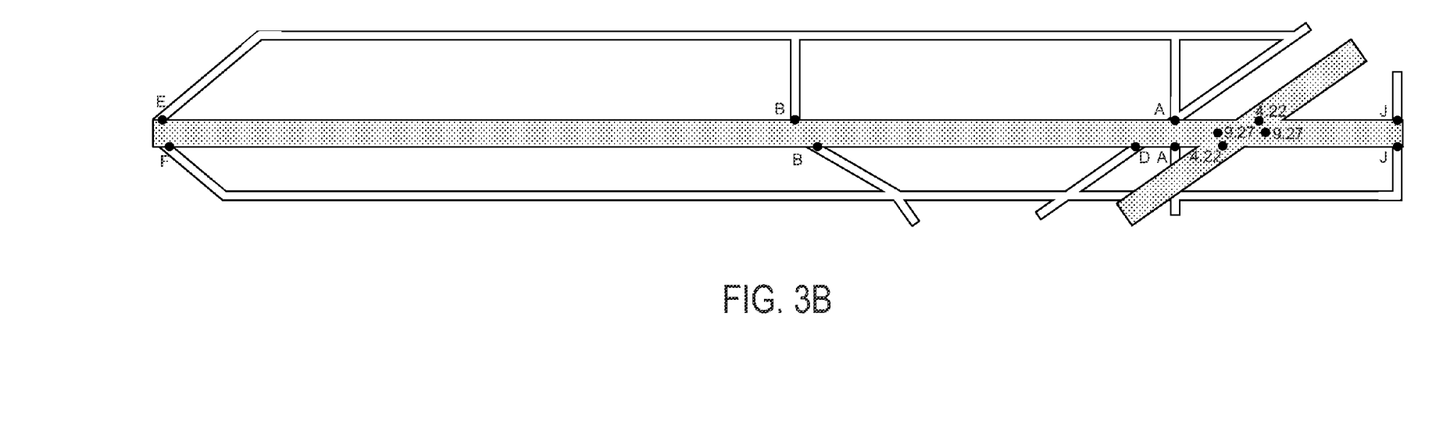
FIG. 3B illustrates "runway holding position" node types and "runway intersection" node types.

Referring to FIG. 3B, fourth and fifth node types are presented. The fourth type may be a "runway entry/exit" node type, where nine of them are illustrated. As shown, one feature identifier is "E", one is "F", two are "B", two are "A", one are "D", and two are "J"; there is not a second D node type because taxiways A and D are assumed to share the same node. The fifth type may be "runway intersection" node type, where four of them are illustrated. As shown, two feature identifiers are "4.22" and two are "9.27" correspond to the name of the correlating runways.

Figure 3C:
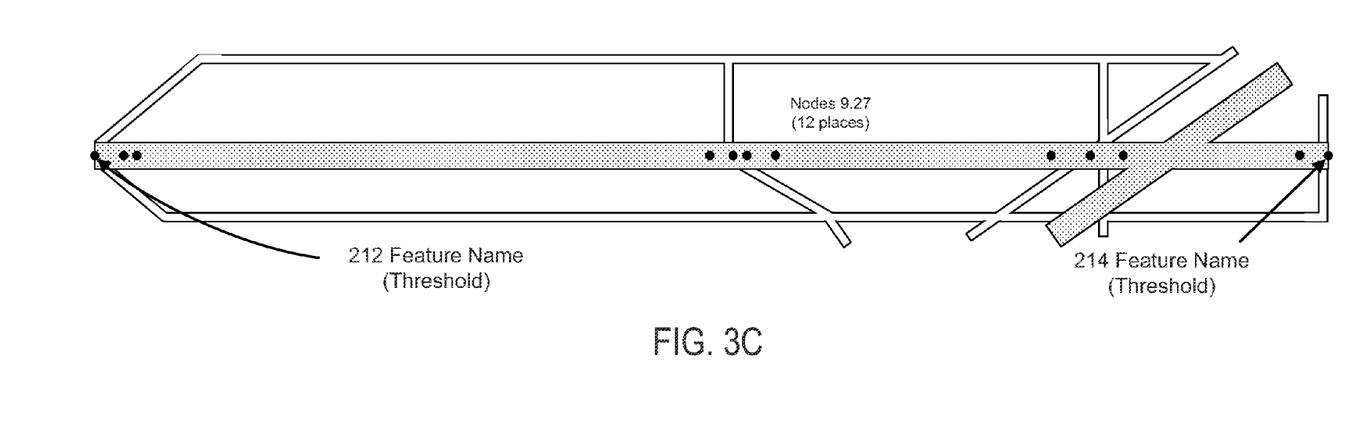
FIG. 3C illustrates "runway exit line" node types.

Referring to FIG. 3C, a sixth node type is presented. The sixth type may be a "runway exit line" node type, where twelve of them are illustrated. As shown, each feature identifier is "9.27" corresponding to the name of the correlating runway. In addition, two of these node types have feature names 212 and 214, where each feature name may be "threshold" corresponding to the thresholds for RWYS 9 and 27, respectively.

In addition to the attributes of the node objects, each node may be associated with local coordinate information to provide its location referenced to an aerodrome reference point ("ARP"), which may be referenced to a designated world geographical location. To associate each node with local coordinate information, geometric features comprised of point geometry and point geometry sets may be employed as specified in ARINC 816.

ARINC 816 defines attributes of an ASRN edge objects which include the following attributes: edge identifier number, feature identifier, feature type, first node reference, second node reference, and edge type. The identifier number may be a unique identifier assigned to one edge by a data provider. The feature identifier may be a logical name of the edge. The feature type may be an identifier which identifies the type of feature as an edge (ARINC 816 has assigned "39" for the edge). The first node reference may be the unique node identifier number corresponding to a start node of the edge geometry, and the second node reference may be the unique node identifier number corresponding to an end node of the edge geometry. The edge type may be a type of edge.

Figure 4A:
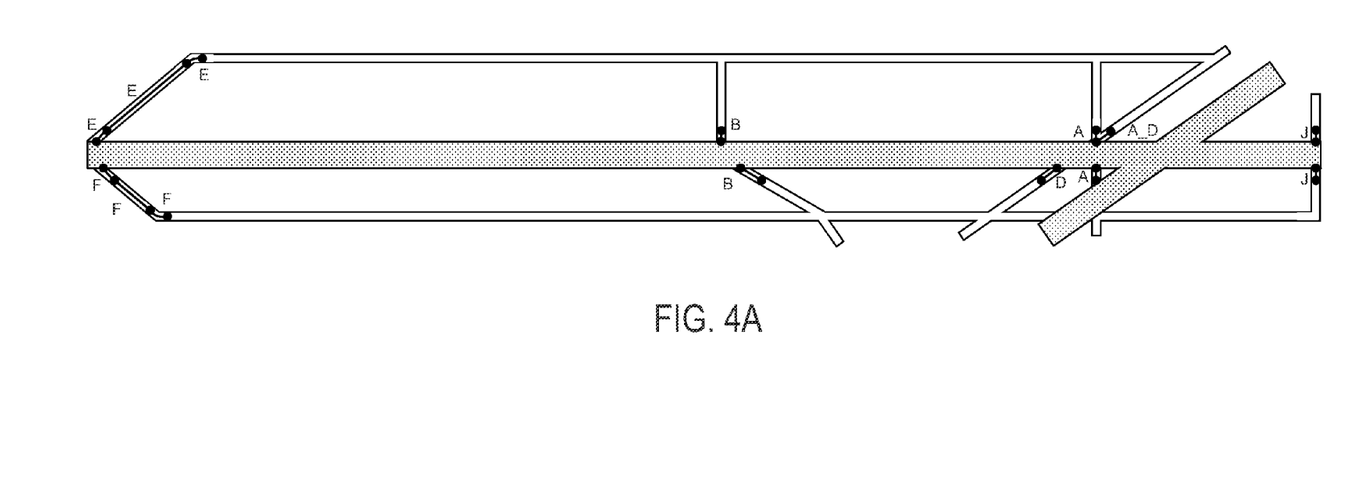
FIG. 4A illustrates "taxiway" edge types.

Referring to FIG. 4A, a first edge type is presented. The first type may be a "taxiway" edge type, where fourteen of them are illustrated. As shown, three feature identifiers are "E", three are "F", two are "B", two are "A", one is "D", one is "A_D", and two are "J".

Figure 4B:
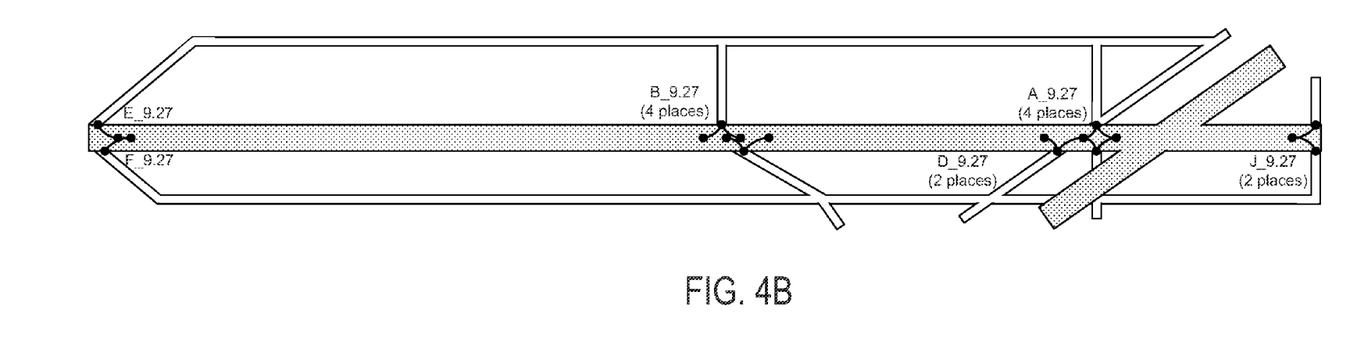
FIG. 4B illustrates "runway exit" edge types.

Referring to FIG. 4B, a second edge type is presented. The second type may be a "runway exit" edge type, where fourteen of them are illustrated. As shown, one feature identifier is "E_9.27", one is "F_9.27", four are "B_9.27", four are "A_9.27", two are "D_9.27", and two are "J_9.27".

Figure 4C:
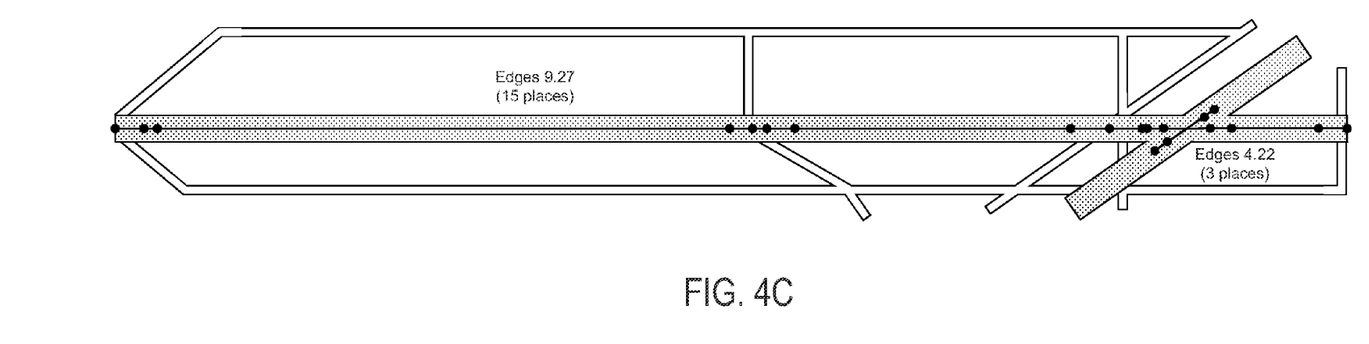
FIG. 4C illustrates "runway" edge types.

Referring to FIG. 4C, the third type may be "runway" edge type, where eighteen of them are illustrated. As shown, fifteen feature identifiers are "9.27" and three are "4.22" correspond to the name of the correlating runways.

In addition to the attributes of the edge objects, each edge may be associated with line elements, Bezier Curve elements, and/or both. Those skilled in the art understand that Bezier Curves may allow a defining of edge geometries with a smaller amount of data while allowing for smoother and faster rendering of the edges. To associate each edge with a Bezier Curve, geometric features comprised of Bezier control points and Bezier control points set may be employed as specified in ARINC 816.

Figure 5:
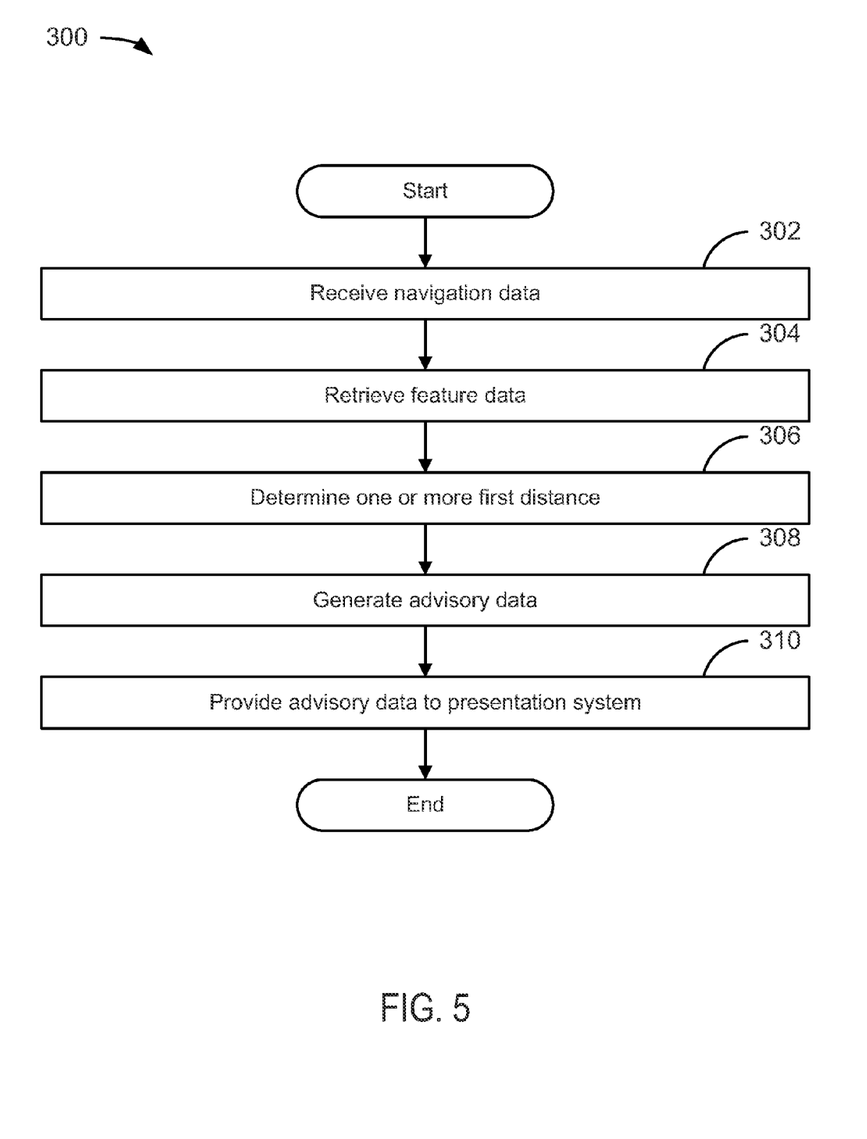
FIG. 5 provides a flowchart illustrating a method for generating an advisory presentable on one or more presentation units.

FIG. 5 depicts flowchart 300 disclosing an example of a method for presenting advisory information, where the AG 130 may be programmed or configured with instructions corresponding to the following modules embodied in flowchart 300. As embodied herein, the AG 130 may be a processor or a combination of processors found in the navigation data source 110, the feature data source 120, and/or the presentation system 140. Also, the AG 130 may be a processor of a physical or tangible module such as, but not limited to, a printed circuit card having one or more input interfaces to facilitate the two-way data communications with the AG 130, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the supplying of data or the making of data available.

Flowchart 300 begins with module 302 with the receiving of navigation data. This data may be representative of at least vehicle location and a designated surface. In one embodiment, the designated surface may be a landing runway issued in a flight clearance. In another embodiment, the designated surface may be a takeoff runway issued in a taxi clearance. In another embodiment, the designated surface may be the current surface, that is, the surface upon which the vehicle is located. In another embodiment, the navigation data may be further comprised of a next surface, that is, the surface onto which the vehicle will operate after exiting the current surface.

The flowchart continues with module 304 with the retrieving of feature data. This data may be representative of one or more edges associated with the designated surface and coordinate information associated with one or more nodes of each edge. Each edge may be comprised of one or more nodes. If the designated surface is comprised of a landing runway or a takeoff runway, edge object(s) with an edge feature identifier attribute containing the identifier of the landing or takeoff runway (RWY 9, RWY 27, etc. . . . ) may be retrieved. Also, the location of each node may be retrieved using the first node reference and second node reference attributes of the edge object(s). If the designated surface is comprised of a current surface, edge object(s) with an edge feature identifier containing the surface identifier (e.g., taxiway identifier such as A, B, C, etc. . . . ) may be retrieved.

The flowchart continues with module 306 with the determining of one or more first distances. Each first distance may be based upon the vehicle location and the coordinate information associated with one node of one edge located in the direction of vehicle travel. If the designated surface is a landing runway, the direction of vehicle travel may be determined by techniques and/or algorithms known to those skilled in the art using the vehicle location information, ground track information, or other information provided by the navigation data source 110. If the designated surface is a takeoff runway, the direction of vehicle travel may be based upon the surfaces identified in a taxi clearance.

In an embodiment in which the designated surface is a landing runway or takeoff runway and one node is associated with a feature name attribute of runway threshold and edge feature identifier attribute containing the identifier of the runway opposing the landing runway or takeoff runway, the first distance may be the distance to the landing threshold of the opposing runway. In another embodiment in which the designated surface is a landing runway or takeoff runway and one node is associated with a runway holding position node type attribute, the first distance may be the distance to the runway holding position.

In an embodiment in which the designated surface is the current surface and one node is associated with a taxiway holding position node type attribute, the first distance may be the distance to the taxiway holding position. In another embodiment in which the designated surface is the current surface and one edge is associated with the next surface represented in the navigation data, the first distance may be the distance to the turning point, that is, the point associated with the commencement of the turn onto the next surface.

In an additional embodiment, a second distance could be determined from all of the first distances, where the second distance could be the shortest first distance. If so, one first distance that is included in the advisory data set may be compromised of the second distance, where the second distance is a distance to a point associated with both a commencement of a turn and one edge associated with a surface other than the designated surface.

In an additional embodiment, a directionality (i.e., left or right) may be determined of each edge that is further associated with a taxiway, where the second distance further corresponds to a first direction. For example, if the edge from which the second distance is located to the left of the aircraft, then the first direction is left; likewise, if the edge from which the second distance is located to the right of the aircraft, then the first direction is right. Then, a third distance could be determined from all of the first distances corresponding to a second direction, where the second direction is right if the first direction as left, and vice versa. If so, one first distance that is included in the advisory data set may be comprised of the third distance, where the third distance is a distance to a point associated with both a commencement of a turn and one edge associated with a surface other than the designated surface.

The flowchart continues with module 308 with the generating of an advisory data set in response to the determination of the first distance(s). The advisory data set may be representative of each first distance. The advisory data set could be comprised of visual advisory data configured for the presentation of distance information on a visual display unit and/or aural advisory data configured for the presentation via an aural advisory unit as well as tactile advisory data configured for the presentation of tactile stimuli via a tactile alerting unit.

The flowchart continues with module 310 with the providing of the advisory data set to the presentation system. The advisory data set may be presented visually on a visual display unit, aurally via an aural alerting unit, and/or tactilely via a tactile alerting unit. In one embodiment, the visual display unit could present distance information in the same or similar fashion as the distance(s) are presented in the Krenz reference. In another embodiment, the visual display unit and/or aural alerting unit could present distance information a textual presentation in any suitable location on the visual display unit and/or aural presentation (e.g. BEGIN TURN TO TWY A IN 250 FEET, RUNWAY HOLDING POSITION IN 250 FEET, RUNWAY THRESHOLD IN 250 FEET). In another embodiment, the tactile alerting unit could present distance information indirectly by activating upon reaching a minimum threshold (e.g., 100 feet prior to reaching a holding position and/or runway threshold). Then, flowchart 300 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for generating at least one advisory presentable via at least one presenting unit, comprising:
 a source of navigation data;
 a source of feature data representative of a plurality of nodes and a plurality of edges, where
  each node represents a point on a surface defined by a coordinate, and
  each edge represents a line on the surface defined by a plurality of nodes; and
 an advisory generator configured to:
  receive navigation data representative of at least vehicle location and a designated surface;
  retrieve feature data representative of
   at least one edge associated with the designated surface, and
   the coordinate of at least one node defining the at least one edge;
  determine one first distance for each node of the at least one node in the direction of vehicle travel as the difference between the node's coordinate and the vehicle location;
  generate an advisory data set responsive to the determination and representative of at least one first distance; and provide the advisory data set to a presentation system, whereby
at least one first distance is presentable via at least one presentation unit.

2. The system of claim 1, wherein
the vehicle is an aircraft,
the designated surface is a landing runway or takeoff runway, and
at least one node of at least one edge is associated with a runway holding position.

3. The system of claim 1, wherein
the vehicle is an aircraft,
the designated surface is a landing runway or takeoff runway, and
at least one node of at least one edge is associated with a runway threshold of the runway opposite of the landing runway or takeoff runway.

4. The system of claim 1, wherein
the advisory generator is further configured to:
determine a second distance from a plurality of first distances, where
the second distance is
the shortest distance of the plurality of first distances, and
the distance to a point corresponding to a commencement of a turn and one edge further associated with a surface other than the designated surface, such that
the generation of the advisory data set is further responsive to the determination of the second distance, and
a first distance presentable via at least one presentation unit is the second distance.

5. The system of claim 4, wherein
the advisory generator is further configured to:
determine a first direction of the one edge further associated with a surface other than the designated surface,
determine one third distance, if any, from the plurality of first distances, where
the third distance is
the shortest distance of the plurality of first distances other than the second distance, and
the distance to a point corresponding to both a commencement of a turn in a second direction and one edge further associated with a surface other than the designated surface, such that
the generation of the advisory data set is further responsive to the determination of the third distance, such that
a first distance presentable via at least one presentation unit is the third distance.

6. The system of claim 1, wherein
the vehicle is an aircraft,
the designated surface is a current surface, and
at least one node of at least one edge is associated with a taxiway holding position.

7. The system of claim 1, wherein
the vehicle is an aircraft,
the designated surface is a current surface,
the navigation data is further representative of a next surface, and
at least one edge is further associated with the next surface.

8. A device for generating at least one advisory presentable via at least one presenting unit, comprising:
an advisory generator configured to:
receive navigation data representative of at least vehicle location and a designated surface;
retrieve feature data from a source of feature data representative of a plurality of nodes and a plurality of edges, where
each node represents a point on a surface defined by a coordinate,
each edge represents a line on the surface defined by a plurality of nodes, and
the feature data being retrieved is representative of
at least one edge associated with the designated surface, and
the coordinate of at least one node defining the at least one edge;
determine one first distance for each node of the at least one node in the direction of vehicle travel as the difference between the node's coordinate and the vehicle location;
generate an advisory data set responsive to the determination and representative of at least one first distance; and
provide the advisory data set to a presentation system, whereby
at least one first distance is presentable via at least one presentation unit.

9. The device of claim 8, wherein
the vehicle is an aircraft,
the designated surface is a landing runway or takeoff runway, and
at least one node of at least one edge is associated with a runway holding position.

10. The device of claim 8, wherein
the vehicle is an aircraft,
the designated surface is a landing runway or takeoff runway, and
at least one node of at least one edge is associated with a runway threshold of the runway opposite of the landing runway or takeoff runway.

11. The device of claim 8, wherein
the advisory generator is further configured to:
determine a second distance from a plurality of first distances, where
the second distance is
the shortest distance of the plurality of first distances, and
the distance to a point corresponding to a commencement of a turn and one edge further associated with a surface other than the designated surface, such that
the generation of the advisory data set is further responsive to the determination of the second distance, and
a first distance presentable via at least one presentation unit is the second distance.

12. The device of claim 11, wherein
the advisory generator is further configured to:
determine a first direction of the one edge further associated with a surface other than the designated surface; and
determine one third distance, if any, from the plurality of first distances, where
the third distance is
the shortest distance of the plurality of first distances other than the second distance, and
the distance to a point corresponding to both a commencement of a turn in a second direction and one edge further associated with a surface other than the designated surface, such that
the generation of the advisory data set is further responsive to the determination of the third distance, and
a first distance presentable via at least one presentation unit is the third distance.

13. The device of claim 8, wherein
the vehicle is an aircraft,
the designated surface is a current surface, and
at least one node of at least one edge is associated with a taxiway holding position.

14. The device of claim 8, wherein
the vehicle is an aircraft,
the designated surface is a current surface,
the navigation data is further representative of a next surface, and
at least one edge is further associated with the next surface.

15. A method for generating at least one advisory presentable via at least one presenting unit, comprising:
performing the following elements, where such elements are performed by an electronic processing unit installed in an aircraft system:
receiving navigation data representative of at least vehicle location and a designated surface;
retrieving feature data from a source of feature data representative of a plurality of nodes and a plurality of edges, where
each node represents a point on a surface defined by a coordinate,
each edge represents a line on the surface defined by a plurality of nodes, and
the feature data being retrieved is representative of
at least one edge associated with the designated surface, and
the coordinate of at least one node defining the at least one edge;
determining one first distance for each node of the at least one node in the direction of vehicle travel as the difference between the node's coordinate and the vehicle location;
generating an advisory data set responsive to the determination and representative of at least one first distance; and
providing the advisory data set to a presentation system, whereby
at least one first distance is presentable via at least one presentation unit.

16. The method of claim 15, wherein
the vehicle is an aircraft,
the designated surface is a landing runway or takeoff runway, and
either at least one node of at least one edge is associated with a runway holding position, or
at least one node of at least one edge is associated with a runway threshold of the runway opposite of the landing runway or takeoff runway.

17. The method of claim 15, further comprising:
determining a second distance from a plurality of first distances, where
the second distance is
the shortest distance of the plurality of first distances, and
the distance to a point corresponding to a commencement of a turn and one edge further associated with a surface other than the designated surface, such that
the generation of the advisory data set is further responsive to the determination of the second distance, and
a first distance presentable via at least one presentation unit is the second distance.

18. The method of claim 17, further comprising:
determining a first direction of the one edge further associated with a surface other than the designated surface; and
determining one third distance, if any, from the plurality of first distances, where
the third distance is
the shortest distance of the plurality of first distances other than the second distance, and
the distance to a point corresponding to both a commencement of a turn in a second direction and one edge further associated with a surface other than the designated surface, such that
the generation of the advisory data set is further responsive to the determination of the third distance, and
a first distance presentable via at least one presentation unit is the third distance.

19. The method of claim 15, wherein
the vehicle is an aircraft,
the designated surface is a current surface, and
at least one node of at least one edge is associated with a taxiway holding position.

20. The method of claim 15, wherein
the vehicle is an aircraft,
the designated surface is a current surface,
the navigation data is further representative of a next surface, and
at least one edge is further associated with the next surface.

* * * * *